United States Patent
Pratt et al.

(10) Patent No.: US 6,181,274 B1
(45) Date of Patent: Jan. 30, 2001

(54) SATELLITE NAVIGATION RECEIVER FOR PRECISE RELATIVE POSITIONING IN REAL TIME

(75) Inventors: Michael M. Pratt, Bolton; Brian P. Burke, Lexington; Pratap N. Misra, Sudbury, all of MA (US)

(73) Assignee: Massachusetts Institute of Technology, Cambridge, MA (US)

( * ) Notice: Under 35 U.S.C. 154(b), the term of this patent shall be extended for 0 days.

(21) Appl. No.: 09/343,743

(22) Filed: Jun. 30, 1999

Related U.S. Application Data (60) Provisional application No. 60/091,316, filed on Jun. 30, 1998.

(51) Int. Cl.[7] .................................................. H04B 7/185
(52) U.S. Cl. ................................. 342/357.04; 342/357.08
(58) Field of Search ........................ 342/357.04, 357.08, 342/357.09

(56) References Cited

U.S. PATENT DOCUMENTS

| | | | |
|---|---|---|---|
| 5,442,363 | * | 8/1995 | Remondi ........................ 342/357.04 |
| 5,991,691 | * | 11/1999 | Johnson ................................ 701/214 |

OTHER PUBLICATIONS

Park, Chansik et al, "Efficient Technique To Fix GPS Carrier Phase Integer Ambiguity On–the–Fly", IEE Proceedings–Radar, Sonar, and Navigation, Jun. 1997, pp. 148–155.*

Han, Shaowei et al, "Integrated Method for Instantaneous Ambiguity Using New Generation GPS Receivers", Position Location and Navigation Symposium 1996, Apr. 1996, pp254–261.*

* cited by examiner

Primary Examiner—Gregory C. Issing
(74) Attorney, Agent, or Firm—Samuels, Gauthier & Stevens, LLP.

(57) ABSTRACT

A navigation receiver system provides real-time precise relative positioning in cooperation with an associated carrier phase receiver. The navigation receiver system and the associated carrier phase receiver both sample signals during a single epoch, and the associated carrier phase receiver processes the received signals to provide and transmit first carrier phase measurement data. The navigation receiver system comprises a data link receiver that receives the first carrier phase measurement data from the associated carrier phase receiver, and a carrier phase receiver that receives carrier phase signals during the sampling epoch, and processes the carrier phase signals to provide a second carrier phase measurement data. The navigation system receiver also includes a processing unit that receives the first carrier phase measurement data and the second carrier phase measurement data and computes carrier phase difference measurements. The processing unit applies a local-minima search technique to the carrier phase difference measurements to resolve carrier phase integer ambiguities within the subspace of local minima, wherein the resolved carrier phase integers are subsequently used to determine a precise relative position of the navigation receiver system with respect to the associated carrier phase receiver. The present invention provides high precision, real-time position data from a signal time epoch. That is, the present invention resolves the integer ambiguities in carrier phase measurements with a single snap shot of the measurements. In addition, the system recovers very quickly following a signal interruption.

12 Claims, 6 Drawing Sheets

SATELLITE NAVIGATION RECEIVER FOR PRECISE RELATIVE POSITIONING IN REAL TIME

CROSS REFERENCE TO RELATED APPLICATIONS

This application claims priority from the provisional application designated serial number 60/091,316 filed Jun. 30, 1998 and entitled "Satellite Navigation Receiver for Precise Relative Positioning in Real Time". This provisional application is hereby incorporated by reference.

GOVERNMENT RIGHTS

This invention was made with government support under Contract F19628-95-C-0002 by the U.S. Air Force. The government may have certain rights in the invention.

BACKGROUND OF THE INVENTION

The present invention relates to radio navigation receivers, and in particular to satellite navigation receivers (e.g., a GPS receiver) for precise relative positioning in real time.

Satellite navigation receivers such as GPS and GLO-NASS are all-weather, worldwide, continuous coverage, satellite-based radio navigation systems. These receivers measure time delays and decode messages from satellites within view of the receivers to determine the information necessary to complete position and time bias calculations. For a detailed discussion see "The Global Positioning System and Inertial Navigation", J. Farrell and M. Barth, McGraw-Hill, 1999.

The quality of the position estimates available to the users of GPS/GLONASS can vary widely. The position errors for different users can range from centimeters to tens of meters. The performance specifications for civil use of the GPS system are given in terms of 95th and 99.99th percentile points of the error in the estimate of all users (i.e., civilian and military). These specifications for the horizontal error are 100 meters and 300 meters respectively for civilian use. Additional resources are required to obtain position estimates of better quality. Real-time position estimates with errors no worse than a few meters can be obtained if the user subscribes to a commercial service broadcasting differential corrections to be applied to the measurements. Actually, in coastal areas such corrections are available for free from the U.S. Coast Guard, which broadcasts them on maritime radio beacons. All the user needs is a radio beacon receiver and a differential-ready GPS receiver.

To get position estimates with centimeter(cm)-level accuracy requires a different approach. Until now, requirements for such accuracy have typically been limited to the geodetic community (e.g., studying plate tectonics), since achieving this level of accuracy has generally required minutes or hours of computation. As is known, GPS carrier phase measurements can provide cm-level positioning accuracy if the integer ambiguities are resolved correctly, and the process of integer ambiguity resolution is often referred to as initialization.

The approach commonly used for initialization (static and kinematic), is to filter measurements from multiple epochs until the floating estimates of the integer ambiguities appear to converge to integer values. With dual-frequency GPS measurements, the wide-lane formulation accelerates this process, but it still takes several minutes. The approach offers robustness in terms of overcoming measurement errors over short stretches. However, this approach is impractical for navigation where a user is unlikely to have the luxury of waiting for minutes for the integer ambiguity to be resolved.

Therefore, there is a need for system that can provide a robust navigation receiver capable of providing centimeter-level accuracy in real-time.

SUMMARY OF THE PRESENT INVENTION

Briefly, according to the present invention, a navigation receiver system provides real-time precise (cm-level) relative positioning in cooperation with an associated carrier phase receiver. The navigation receiver system and the associated carrier phase receiver both sample signals during a single epoch, and the associated carrier phase receiver processes the received signals to provide and transmit first carrier phase measurement data to the navigation receiver system. The navigation receiver system comprises a data link receiver that receives the first carrier phase measurement data from the associated carrier phase receiver, and a carrier phase receiver that receives carrier phase signals during the sampling epoch, and processes the carrier phase signals to provide a second carrier phase measurement data. The navigation system receiver also includes a processing unit that receives the first carrier phase measurement data and the second carrier phase measurement data and computes carrier phase difference measurements. The processing unit applies a local-minima search (LMS) technique to the carrier phase difference measurements to resolve carrier phase integer ambiguities within a subspace of local minima, wherein the resolved carrier phase integers are subsequently used to determine a precise relative position of the navigation receiver system with respect to the associated carrier phase receiver.

According another aspect of the present invention, a high accuracy navigation system includes a navigation receiver system and an associated carrier phase receiver, wherein the navigation system receiver provides real-time precise relative positioning in cooperation with the associated carrier phase receiver. The navigation receiver system and the associated carrier phase receiver both sample signals during a single epoch, and the associated carrier phase receiver processes the received signals to provide and transmit first carrier phase measurement data. The navigation receiver system comprises a data link receiver that receives the first carrier phase measurement data from the associated carrier phase receiver, and a carrier phase receiver that receives carrier phase signals during the sampling epoch, and processes the carrier phase signals to provide a second carrier phase measurement data. The navigation system receiver also includes a processing unit that receives the first carrier phase measurement data and the second carrier phase measurement data and computes carrier phase difference measurements. The processing unit applies a local-minima search technique to the carrier phase difference measurements to resolve carrier phase integer ambiguities within a subspace of local minima, wherein the resolved carrier phase integers are subsequently used to determine a precise relative position of the navigation receiver system with respect to the associated carrier phase receiver.

The processing unit reads the two sets of carrier phase measurements, forms difference combinations, uses a numerical method to find integer solutions that are local minima of a cost function associated with the difference combinations. The processing unit compares the cost function value for each of the local minima and selects the one with the smallest value (i.e., a global minimum), and uses the resulting resolved integers in conjunction with the two sets of carrier phase measurements to compute the relative position.

The local-minima search (LMS) technique is a deterministic method for resolving carrier phase ambiguities. The geometry of the carrier phase ambiguity resolution problem leads to the realization that the subspace of integer solutions that are local minima of a least squares cost function comprise a three dimensional subspace of the full ambiguity space. The combination of an analytical expression for the subspace of local minima, and a numerical method for computing elements of that subspace, results in an efficient, deterministic method for resolving carrier phase ambiguities.

Relative position is the position of the navigation receiver system relative to the associated carrier phase receiver. If the precise coordinates of the associated carrier receiver are known, then the precise coordinates of the navigation receiver system can also be determined. However, the associated carrier receiver may also be mobile and therefore the relative position is from a mobile position.

Advantageously, the present invention provides high precision, real-time position data from a signal time epoch. That is, the present invention resolves the integer ambiguities in carrier phase measurements with a single snap shot of the measurements. In addition, the system recovers very quickly following signal interruption.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
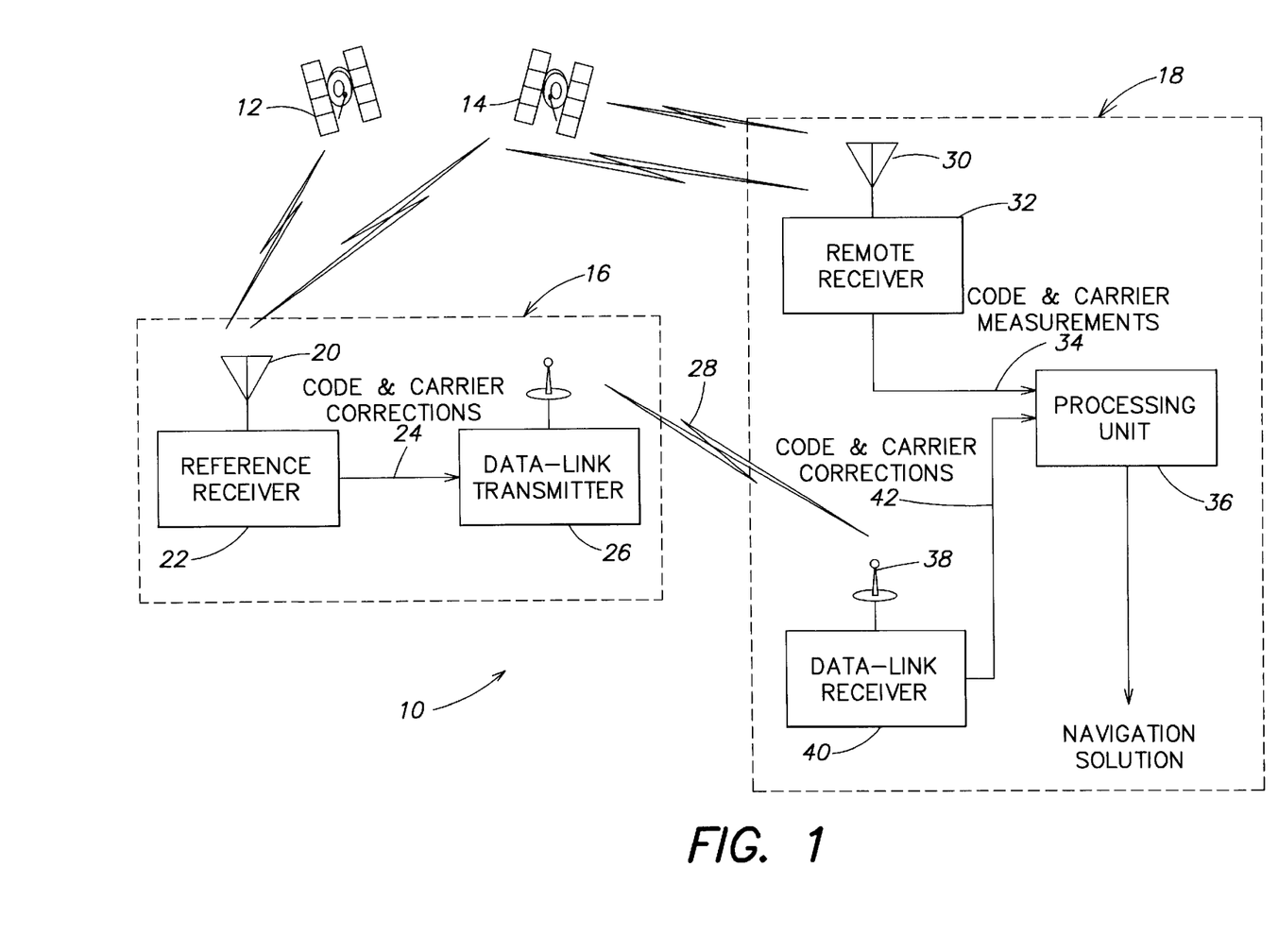
FIG. 1 is a functional block diagram of a receiver system according to the present invention.

FIG. 1 is a functional block diagram of a high accuracy navigation system 10. The system 10 includes a plurality of orbiting satellite transmitters 12, 14 that transmit encoded radio signals in a known manner to a first receiver system 16 and a second receiver system 18. The receiver systems 16, 18 receive and decode the encoded radio signals to provide position, velocity and timing information to the receiver users. In preferred embodiments, the transmitted encoded data may be associated with GPS satellites and/or GLONASS satellites.

The first receiver system 16 includes an antenna 20 that captures the transmitted encoded radio signals and a receiver 22 that processes the received encoded signals in a known manner to provide code and carrier corrections on a line 24 (e.g., an RS-232 serial link, a parallel communication link, etc.) to a data-link transmitter 26. An example of the receiver 22 is an Ashtech Corporation model GG24 receiver. The data link transmitter 26 transmits the code and carrier corrections 28 to the second receiver system 18. The first receiver system 16 may also provide psuedorange data to the second receiver system 18 via the data link.

The second receiver system 18 includes an antenna 30 and a receiver 32 (e.g., an Ashtech GG24) that provides code and carrier measurements over a communications link 34 to a processing unit 36 (e.g., Sun Microsystems, Inc., SPARC processor). The antenna 30 and receiver 32 are tuned to receive the encoded signals from the satellites 12, 14. The system 18 also includes a data-link receive antenna 38 and an associated data-link receiver 40 that receive the code and carrier corrections 28 transmitted by the data-link transmitter 26. The received code and carrier corrections from the first receiver system 16 are provided on a line 42 to the processing unit 36.

According to the present invention, the processing unit 36 employs a local minima search technique that processes the received code and carrier corrections to resolve integer ambiguities measurements. In one embodiment, this is accomplished with measurements from a single epoch. The success of the search depends upon the number of measurements available at an epoch and the approach would have only limited tolerance of unmodeled errors. Given an adequate number of measurements without excessive amount of error, the present invention provides the results in real-time. The technique of the present invention limits the search volume and efficiently orders the search. Although the present invention preferably uses a single epoch for fastest execution, it is contemplated that the present invention may also use multi-epoch measurements if single measurements are inadequate when the first and second receivers 16, 18 are relatively far about (e.g ., more than about 10 km).

The availability of GLONASS receivers recently has led to interest in combining GPS and GLONASS code and carrier phase measurements to achieve higher accuracy and robustness in position estimates. Initial attempts to combine carrier phase measurements, however, showed that GLONASS' use of multiple frequencies was an impediment to a clean formulation of the double-difference equations in terms of integer ambiguities. According to an aspect of the present invention GLONASS double-difference equations may be used that are identical in form to those from GPS.

Carrier Phase Double Differences

We shall now formulate basic double-difference equations for GLONASS carrier phase measurements, and present an approach that allows these equations to be written similar to their GPS counterparts, thus allowing the two sets to be combined cleanly. Although double-difference equations are discussed, one of ordinary skill will recognize that single difference equations may also be used. Specifically, the fundamental carrier phase double-difference equation for satellites i and j applicable to both GPS and GLONASS can be written as:

$$\phi^{ij} = \kappa^i \rho^i - \kappa^j \rho^j + (\kappa^i - \kappa^j)b + N^{ij} + \alpha^{ij} \quad \text{(EQ. 1)}$$

where $$\alpha^{ij} = \kappa^i T^i - \kappa^j T^j - \left(\kappa^i \frac{I^i}{f_i^2} - \kappa^j \frac{I^j}{f_j^2}\right)$$

$\phi^{ij}$ double-difference carrier phase (cycles)

$\rho^i$ single difference of range to satellite i (meters)

$\kappa^i$ wave number for satellite i (cycles/meter), $\kappa^i = 1/\lambda^i$, for wavelength $\lambda^i$ b single difference of receiver clock bias (meters)

$N^{ij}$ double-difference integer (cycles)

$T^i$ single difference tropospheric delay (meters)

$I^i/f_i^2$ single difference ionospheric advance for satellite i (meters)

$f_i$ carrier frequency for satellite i (Hertz)

Referring to EQ. 1, the term $$(\kappa^i-\kappa^j)=(f_i-f_j)(b/c),$$

where c is the speed of light, is identically zero for all L1 double differences involving only GPS satellites, since all GPS satellites broadcast at 1575.42 MHz. The GLONASS L1 frequencies currently are 1602+n(9/16) MHz for n=1,2, . . . , 24. It follows that double differences involving one or more GLONASS satellites will have a non-zero clock term. It appears at first that the use of GLONASS invalidates one of the great advantages of double differencing, i.e., cancellation of the receiver clock term. However, the GLONASS double differences can be written similar to their GPS counterparts using the code-based estimate of the clock term in EQ. 1.

For a double difference formed using two GLONASS satellites, the clock term coefficient $(f_i-f_j)$ will be no greater than 23(9/16) MHz. If the differential code-based estimate for b is used as an estimate in $(f_i-f_j)(b/c)$, then an error is committed of $(f_i-f_j) \delta b/c$, where $\delta b$ is the error in the clock estimate. For GPS alone, code differential clock errors can be expected to be less than 3 meters (10 ns), and for combined system code the errors are even less. Since a GLONASS reference satellite can be chosen from the middle of the GLONASS L1 frequency range, the clock term coefficient will be less than roughly 7 MHz resulting in an error of less than 0.07 cycle. Significantly, this worst-case error is small enough that the clock term can be treated as known when using double-difference equations for GLONASS. It should be noted that the clock estimate is often better than 1 meter and a judicious choice of difference scheme can reduce this term much further. A more realistic estimate of this term would be 0.02 cycle, which approaches measurement noise.

If GPS-GLONASS double differences are formed, the clock term coefficient grows to approximately 30 MHz. Acceptable double differences may still be formed in this manner if the receiver clock bias were known more accurately. However, for the purposes of brevity we shall limit ourselves to GPS-GPS and GLONASS-GLONASS double differences, thus effectively reducing the number of possible double differences by one. It should be noted that the GLONASS L1 band will be cut in half by 2005, further reducing the potential magnitude of the clock bias term.

Local Minima Search Method

Integer search methods first generate candidate integer solutions to the double-difference phase equations, and evaluate them to determine which is most likely to be correct. It is obvious that any method which fails to generate the correct integers will not be very useful. Notably, the search technique of the present invention generates the correct trial integers 100% of the time (in the absence of large anomalies in the phase measurements).

If equation EQ. 1 is linearized about the differential code solution $x_0$, if it is assumed that the ionospheric and tropospheric terms are small or are adequately modeled, and if the receiver clock term is replaced by its estimate as described above, then EQ. 1 becomes, $$v^{ij}=H^{ij} \cdot \delta x_0 + N^{ij} \quad (EQ. 2)$$

where $$v^{ij}=\phi^{ij}-(\kappa^i \rho^i(x_0)-\kappa^j \rho^j(x_0))-(\kappa^i-\kappa^j)b_0$$
$$H^{ij}=(\kappa^i \partial \rho^i/\partial x - \kappa^j \partial \rho^j/\partial x)|_{x0}, \text{(3-vector)}$$

$\delta x_0$: error in differential code-based position estimate $x_0$ $b_0$: differential code-based clock estimate Referring to EQ. 2, $v^{ij}$ can be seen as a floating estimate of the double-difference integer $N^{ij}$ based on the code position and clock estimate. The vector form of EQ. 2 can be expressed as:

$$v = H \delta x_0 + N \quad (EQ. 3)$$

with resulting least squares estimate, $$\hat{\delta x}_0 = (H^T H)^{-1} H^T (v-N)$$

Substituting $\hat{\delta x}_0$ back into EQ. 3 gives the least squares residual vector, $$r = Q(v-N)$$

where $$Q = I - P = I - H(H^T H)^{-1} H^T$$

The objective is to minimize our cost function $r^T r$ with respect to integer vectors N. This task is difficult because $r^T r$ is a very lumpy function of N (i.e., there are many local minima). The present invention finds the global minimum of the cost function by exhaustively finding and testing the local minima. The local minima is a reduced dimensional subspace (e.g., preferably three) that can be searched in real time to enumerate the local minima.

The definition of a local minimum over a discrete space is that a step by one in any direction from the local minimum results in a larger value for the cost function. In the definition of Q, the matrix P is a projection onto the range space of H, $\mathfrak{R}(H)$ and Q is a projection onto $\mathfrak{R}^\perp(H)$. Being a projection, Q is symmetric and idempotent, and the cost function can be written as, $$r^T r = (v-N)^T Q(v-N) \quad (EQ. 4)$$

If $\Delta N$ is a hypothetical one-step vector, that is, a vector such as (0,0, . . . ,±1,0, . . . , 0), then for N to be a local minimum it follows that, $$(v-N)^T Q(v-N) < (v-N-\Delta N)^T Q(v-N-\Delta N) \quad (EQ. 5)$$

This can be reduced to, $$Qv - \frac{1}{2}D < QN < Qv + \frac{1}{2}D \quad (EQ. 6)$$

where D is the main diagonal of Q. The inequality EQ. 6 is interpreted as a set of n inequalities, where n is the number of double differences. Going from the scalar set forth in EQ. 4 to the vector inequality in EQ. 6 is analogous to taking a gradient when finding a minimum in a continuous space. We have formed a discrete space gradient. Since Q is a projection, it is easy to show that $0 \leq Q_{kk} \leq 1$. This result shows that the inequality set forth in EQ. 6 makes sense as an order relation, and gives an idea of the magnitude of the constraint implied. The inequality of EQ. 6 defines the subset of the n-dimensional space of integers which contains the local minima of the cost function. Since H is (n×3), $\mathfrak{R}(H)$ is (in general) three dimensional. It follows that $\mathfrak{R}(Q)$ is (n−3) dimensional and the null space of Q is three dimensional. This implies that even though the inequality in EQ. 6 is n relations among n unknowns, solutions are not unique. If M is a solution to EQ. 6, and if $\Delta M$ is in the null space of Q (or nearly so), then $M+\Delta M$ will also satisfy the inequality. This is what we meant by the statement set forth above that the cost function has many local minima. The inequality of EQ. 6 is at the heart of LMS since it allows us to restrict attention to the local minima.

Figure 2:
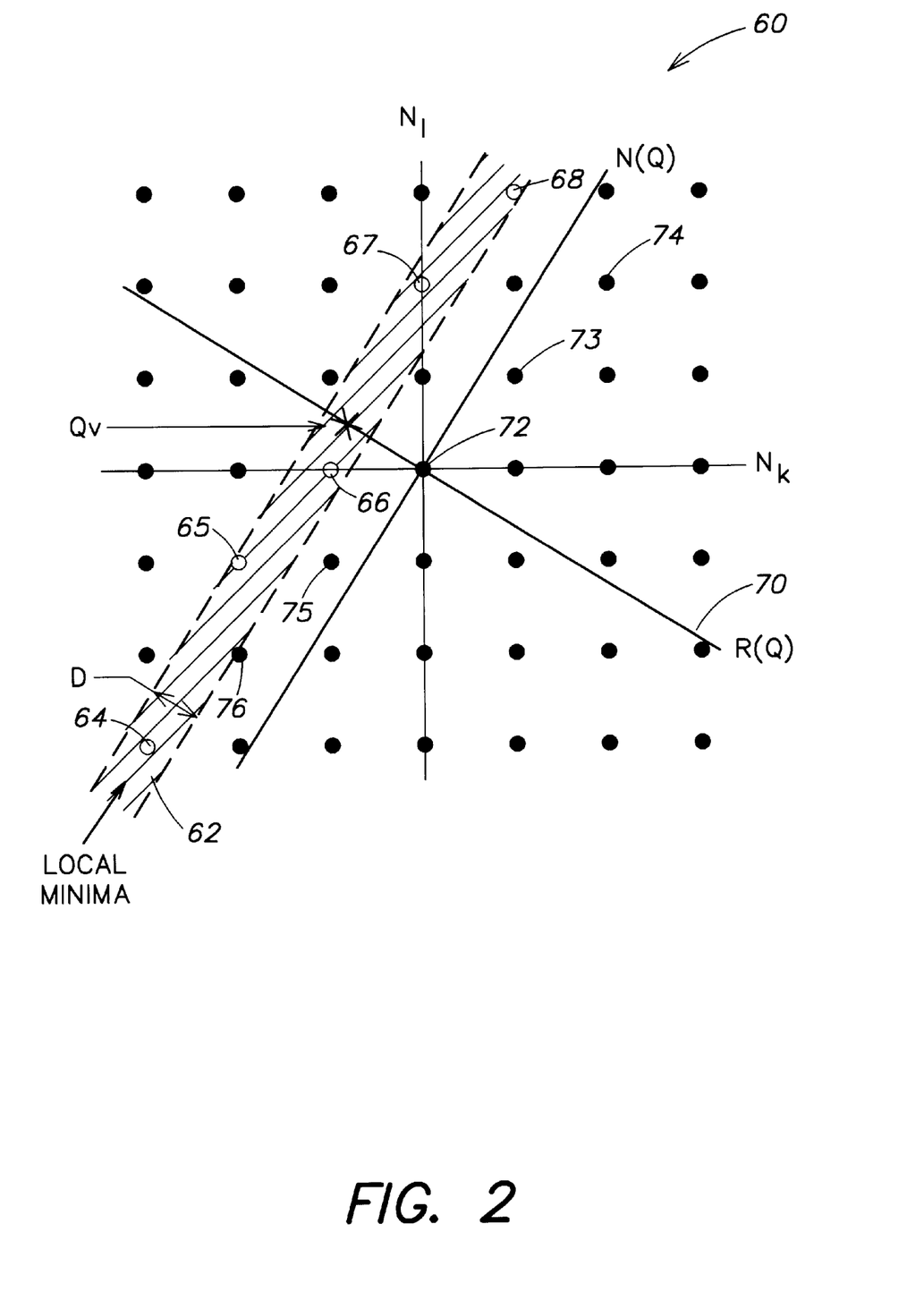
FIG. 2 is a graphical representation of the subspaces and subsets in the LMS technique of the present invention.

Before discussing methods for solving the inequality of EQ. 6, it is worth examining the geometry of the problem. FIG. 2 is a graphical representation 60 of the subspaces and subsets involved, and shows in gray the area 62 defined by EQ. 6. The integer grid points that are local minima are depicted as hollow circles 64–68. Q projects points orthogonally onto $\Re(Q)$ 70. If the projection of an integer grid point is within ½ D of Qv, then it is a local minimum. It is clear that the number of grid points within the gray area 62 is a function of the orientation of the subspaces involved and of the vector D. Since the geometry is a function of the double-differencing technique, there is a great deal of flexibility in the construction of the local minima subset.

One way to solve the inequality of EQ. 6 is to find an integer representation of the null space of Q, and add these vectors to a solution of QN=Qv. Referring to FIG. 2, grid points {(0,0), (1,2),(2,3),(−1,−1),(−2,−3)} 72–76 respectively, are points near to the null space of Q. A particular solution of QN=Qv can be found by starting at the origin 72 and 'walking' down hill until a local minimum is reached. In the case of FIG. 2 the point (−1,0) 66 would be found. Adding the null space grid points to this particular solution reconstructs the subset of local minima. We take the more direct approach to solving QN=Qv described below.

To solve QN=Qv, we perform an LU decomposition of Q with partial pivoting to get, $$UN=L^{-1}Qv \quad (EQ.\ 7)$$

Since the rank of Q is (n−3), the lower rightmost (3×3) block of U will be all zeroes and the last three elements of N will be unconstrained by the above equation. These elements are exhaustively iterated and the remaining integers determined by a back substitution using the above triangular system (EQ. 7). At each step in the back substitution, the resulting floating estimate is replaced with its nearest integer. If the integer fails inequality EQ. 6, that trial is thrown out. If the back substitution passes inequality EQ. 6 at each step, then another local minimum has been identified. Partial pivoting is used for the LU decomposition because it is advantageous to decide which integers end up as the last 3, termed 'search integers'.

As noted above, the technique involves actually finding an integer representation of the null space of Q. It follows that to traverse this subspace quickly, we should choose search integer directions that are as perpendicular to this subspace as possible. The integer basis vectors satisfying this condition are those associated with the smallest column vectors of Q. Referring again to FIG. 2, stepping along the axis $N_k$ will cover more distance per step along the gray band than an $N_l$ step because the projection of $N_k$ onto the null space of Q is smaller than the projection of $N_l$. This should not be taken as a statement about physical space. It is merely saying that some integers can be large and we would like to avoid using them as one of our search integers. The search integers are an index set for the set of local minima, with the back substitution providing the mapping between the two sets. The index set is bounded based on experience. Not every index point generates a local minimum, so even though the index set is three dimensional, we say that LMS reduces the search volume.

One other point should be made about the back substitution step. It is important that the diagonal elements of U be kept as large as possible, otherwise measurement errors would be magnified, possibly preventing the correct integers from being generated.

For simplicity, we have omitted any mention of correlations among the double differences. We account for these correlations by introducing the appropriate weighting matrix when computing residuals.

Measurement Error and Receiver Calibration

There are a number of issues the carrier phase user must be aware of when using GLONASS measurements. We discuss some of them below, in addition we briefly mention atmospheric modeling.

A. System Time and Receiver Clock Jumps

The GPS and GLONASS systems clocks are independent and differ by the number of leap seconds introduced since the start of GPS system time plus a small, slowly varying, time dependent term on the order of 10 $\mu$s. The Ashtech GG24 GPS-GLONASS receivers used in this work record measurements at intervals kept to within ±1 ms of GPS time points. Therefore, two receivers will make measurements within 2 ms of each other. Since the time dependent part of the GPS/GLONASS system time difference is slowly varying, the receiver-to-receiver first difference of a GLONASS measurement will effectively cancel the system time offset term.

The receiver maintains rough measurement alignment with GPS 'time points' by 'jumping' the receiver clock by 2 ms in the appropriate direction when the clock wanders off by more than 1 ms. If the receiver is set to record once per second, then the GPS 'time points' are integer seconds according to GPS system time. The reason for the 2-ms jump rather than the 1-ms jump common to GPS receivers is to avoid half cycle ambiguity problems with GLONASS phases. Since the GLONASS frequency step between channels is 0.5625 MHz, and the odd GLONASS channels will experience half-integer jumps in phase when the receiver clock jumps 1 ms. With a 2-ms jump, all GLONASS phases experience an integral jump. When the receiver executes a clock jump, both the pseudoranges and the phases jump. This is fortunate since we use the pseudorange derived clock in our double-difference equations and these measurements must reflect the same clock. Note that a receiver clock jump cancels out when forming GPS double differences, but not for GLONASS since each GLONASS channel jumps by a different number of cycles.

B. Receiver and Antenna Calibration

Receiver calibration is an important consideration for the carrier phase user, and antenna calibration must also be considered when multiple frequencies are involved. During testing single-receiver, single-satellite channel differences for the GG24 model receiver showed no interchannel or time dependent problems. Zero-baseline, common-clock double differences were essentially unbiased once the clock was accounted for, indicating that there are no frequency dependent calibration terms, or the frequency-dependent terms are common between receivers. The pseudoranges did show several meters of bias as a function of frequency and could produce a small bias in the differential clock estimate, and therefore in GLONASS double-difference phase residuals. The antennas used for data collection were prototype Ashtech antennas with helical elements and no ground planes. Because of the multiple GLONASS frequencies, multiple phase centers are possible. We looked for any difference in phase centers between the two antennas by looking for elevation-dependent biases in double-difference residuals for measurements with the antennas several meters apart, again using a common clock. We were not able to detect any such biases indicating that the antennas have small and/or similar phase center offsets for the different GLONASS frequencies.

C. Datums

Our processing takes into account the differences between WGS84 and PZ-90, the coordinate frames of GPS and GLONASS, respectively. For short baselines, however, the effect is insignificant.

D. Modeling of Atmospheric Effects

The ionospheric advance and the tropospheric delay in EQ. 1 present serious problems for integer ambiguity resolution, especially for the user limited to L1-only receivers. For the 2-km baseline, which had approximately 20 m of vertical separation between the stations, we found double-difference tropospheric delays on the order of 0.5 cycles, or 10 cm. Application of the tropospheric model UNB4 was effective in reducing tropospheric errors to well below multipath. Multipath errors are typically on the order of 0.1 cycle. Modification of the model to accept measured meteorological parameters had no noticeable benefit. Using dual frequency GPS measurements we found a small but significant ionospheric advance over the 2-km baseline. Application of the broadcast model did little to reduce this. Estimation of first difference ionospheric effects is a priority if L1-only baselines are to be extended significantly.

Tests using the Ashtech GG24 receivers were been conducted with baselines of 2 km and 5 km. In each test, the measurements were taken 5 seconds apart for about 24 hours. The data were processed using the LMS algorithm epoch by epoch to resolve the integer ambiguities. The results are summarized in the table below. A position estimate with an error of less than 5 cm is considered successful.

| Baseline | No. of samples | No. successful (% of total) |
|----------|----------------|------------------------------|
| 2 km     | 17216          | 16838 (97.8%)                |
| 5 km     | 16904          | 14085 (83.3%)                |

Similar results were obtained with dual frequency GPS measurements. The success rate with GPS L1-only data over the 2 km baseline was quite limited: integer ambiguities could be resolved in only about 20% of the cases using single-epoch measurements.

Figure 3A:
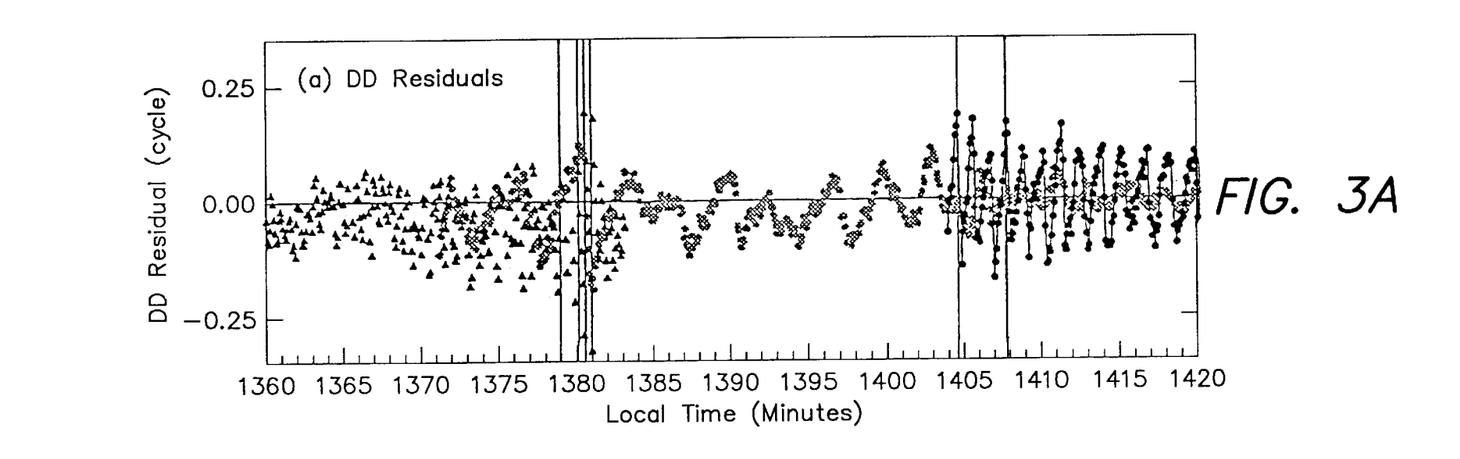
FIGS. 3A–3D and FIGS. 4A–4D are plots of test results from testing of a system according to the present invention at 2-km and 5 km baselines, respectively, over a one-hour period.
Figure 3B:
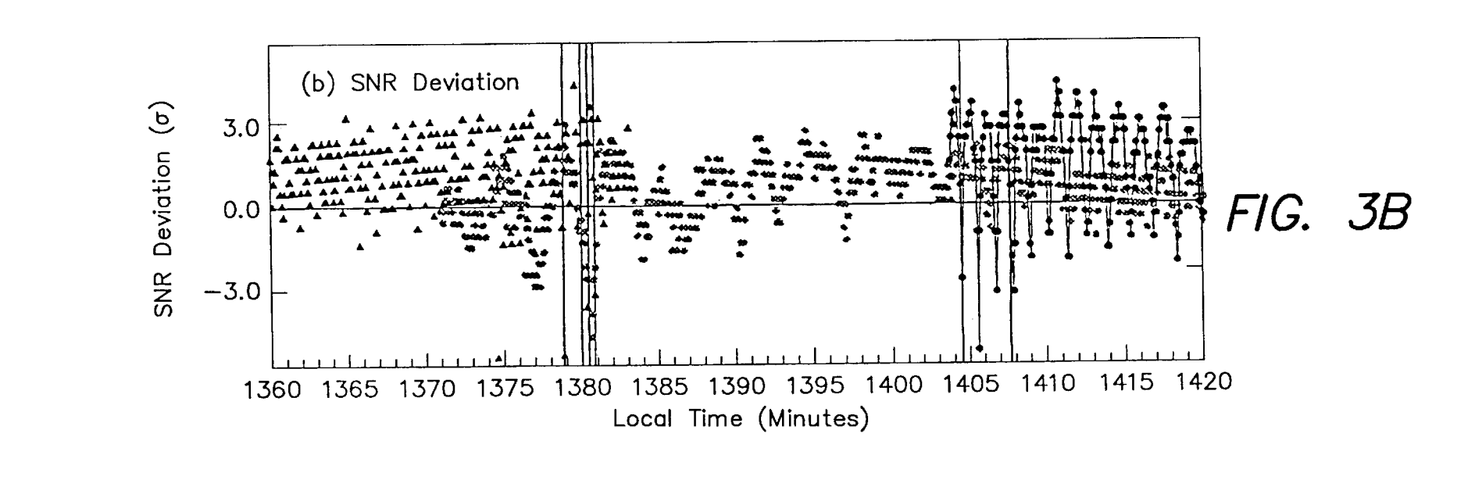
Figure 3C:
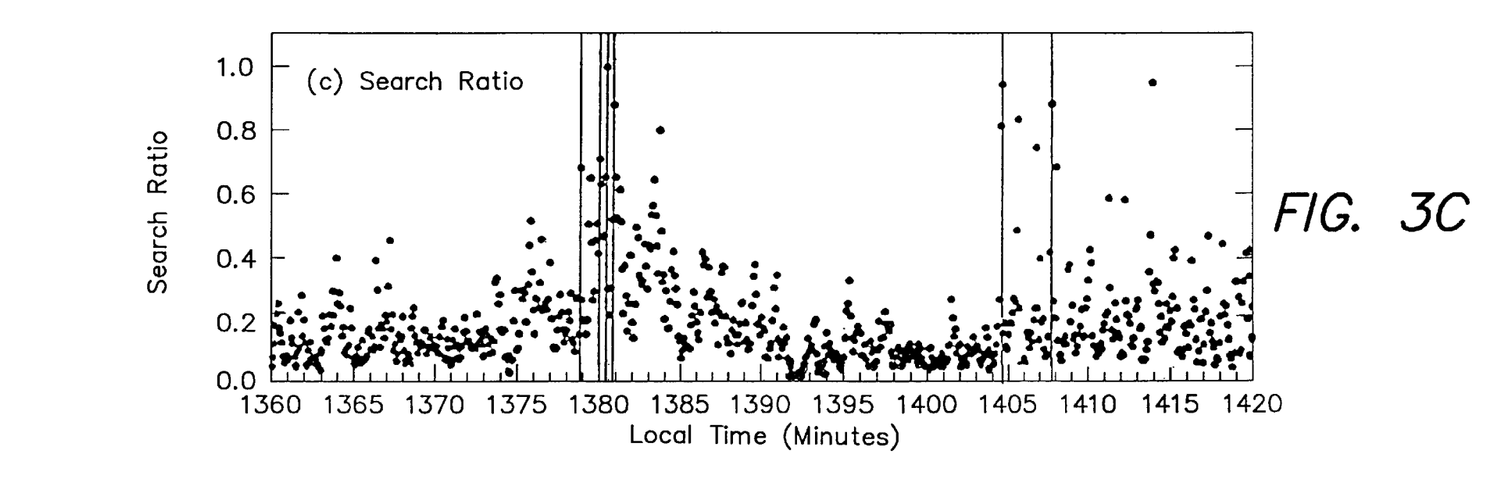
Figure 3D:
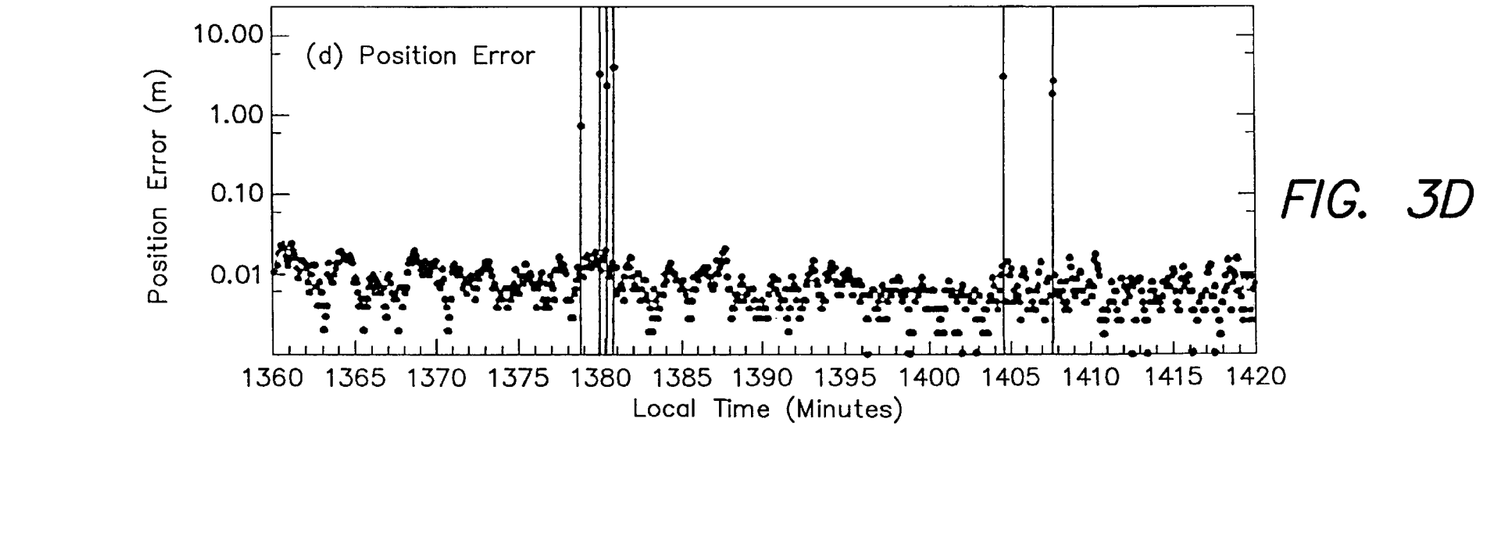

FIGS. 3A–3D presents data and results for measurements from the 2 km baseline over a 1-hour period. FIG. 3A illustrates measurement residuals in cycles for a few satellites. The residuals are computed using the surveyed position of the remote antenna. FIG. 3B illustrates the deviation in the signal-to-noise ratio (SNR) from the mean expressed in standard deviations. The intent is to derive an indicator for multipath. The SNR data correspond to the satellites shown in FIG. 3A. FIG. 3C illustrates the search ratio, i.e., the ratio of the square of the smallest residual norm found by the search, divided by the next smallest. The purpose was to determine if the best local minimum found is much better or only slightly better than the next best. FIG. 3D illustrates the distance of the integer solution from the surveyed position on a log scale. The vertical lines running across FIGS. 3A–3D identify the epochs at which the search method failed.

From FIGS. 3A–3D, it can be seen that the measurement residuals are essentially zero mean and have oscillations consistent in magnitude and frequency with multipath. It can also be seen that the failures, which are rare, are correlated with large values of the SNR deviation. In general, the search ratio is less than 0.6 when the method works and larger than 0.6 when it does not. It is contemplated that a multipath mitigation scheme based on the SNR may improve these results, and allow the search ratio to be used as a reliable validation statistic.

Figure 4A:
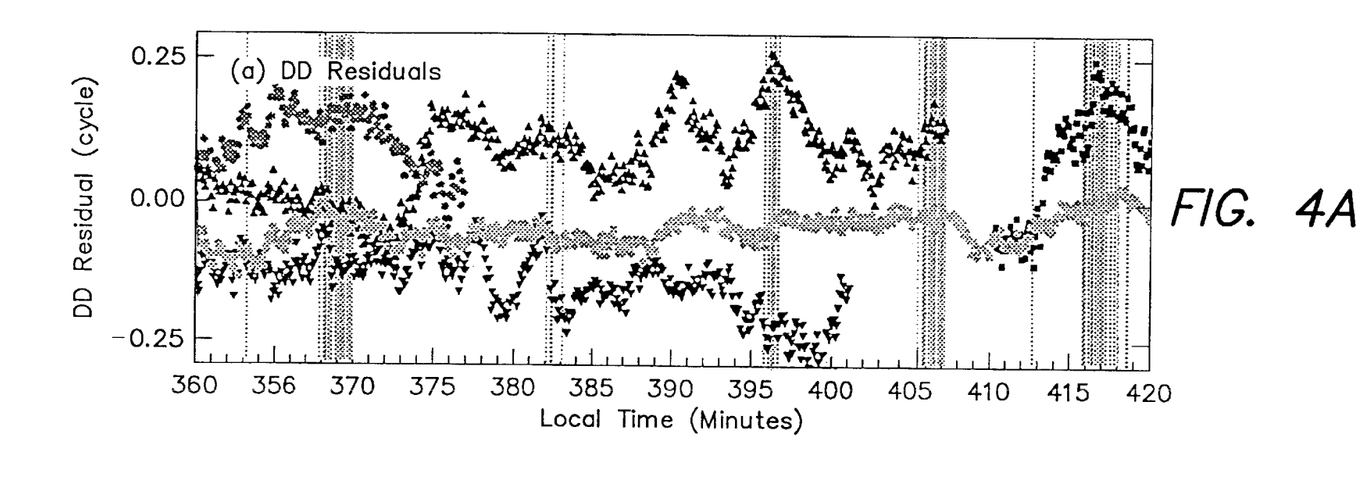
Figure 4B:
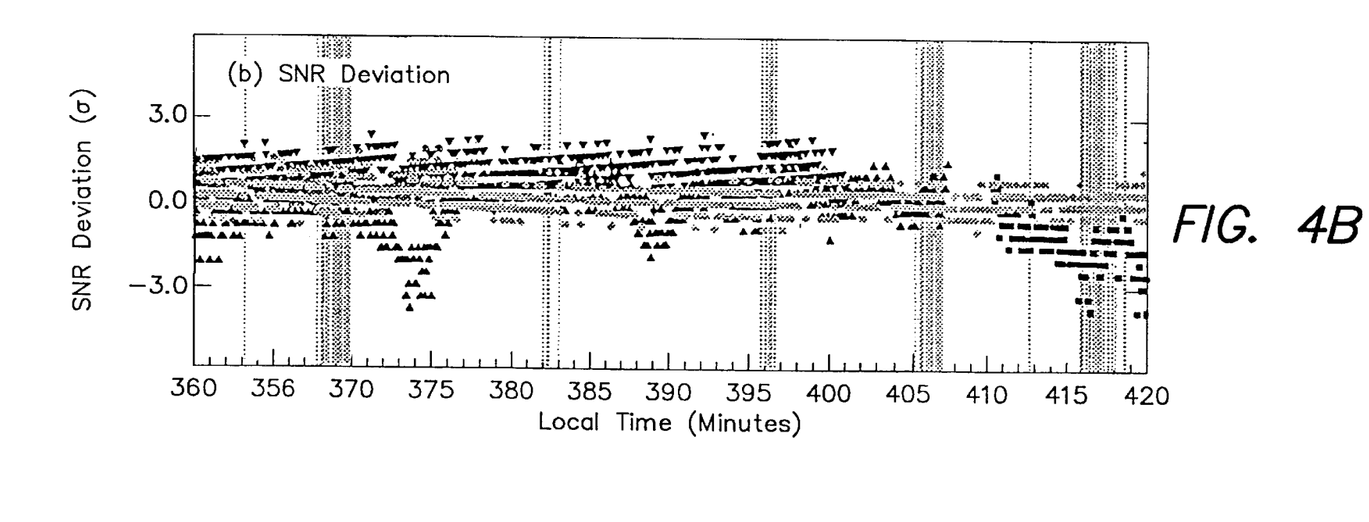
Figure 4C:
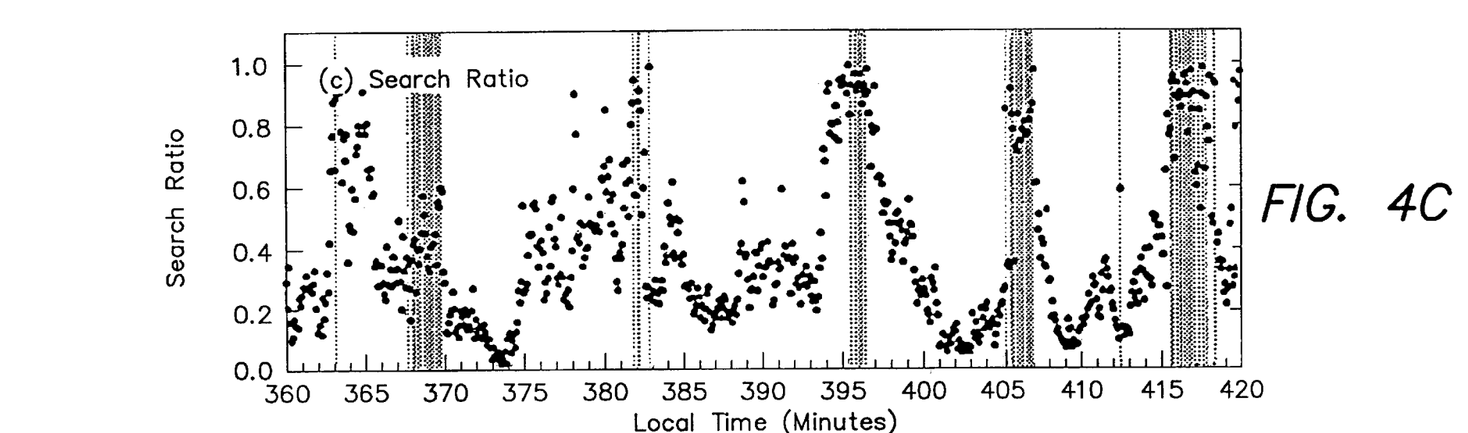
Figure 4D:
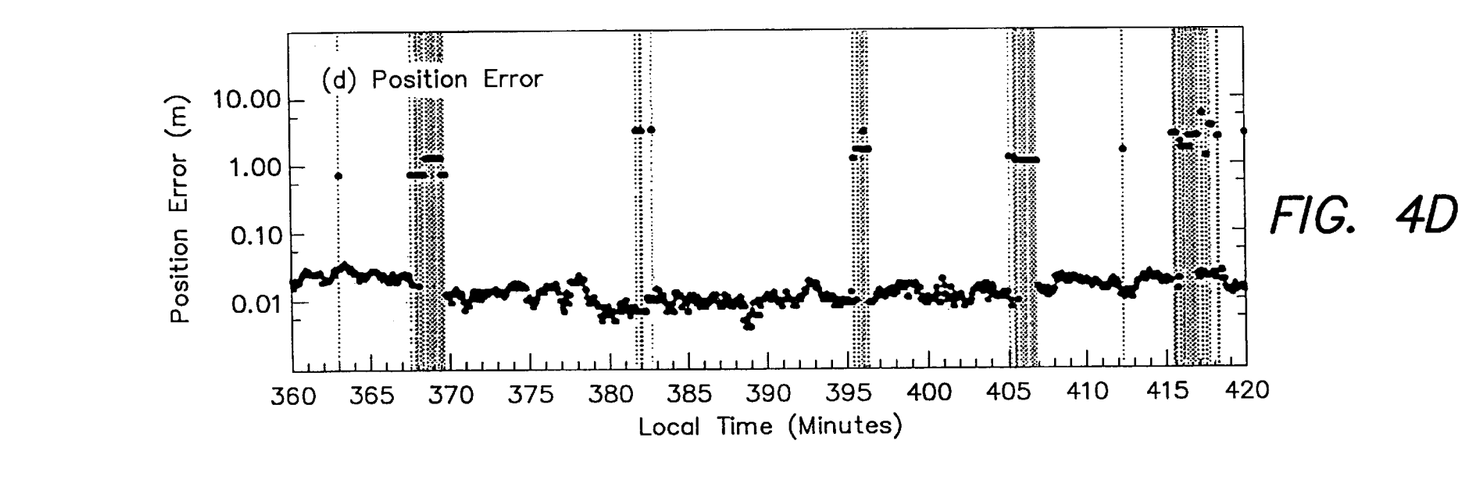

FIGS. 4A–4D present the same information as in FIGS. 3A–3D, but for the 5-km baseline data. The measurement residuals are qualitatively different than in the 2-km case, now exhibiting not only multipath but also biases correlated over 30-minute intervals. From the long time scale of the biases and the fact that the second panel shows no unusual SNR values, it follows that the biases are due to differential ionospheric and/or tropospheric effects. Analysis of dual frequency GPS data over the 5-km baseline indicates that part of the error is due to the ionosphere. We have no reason to believe that the ionospheric activity was unusual on the day we collected data. The search ratios shown in FIG. 4C provide no clear distinction between when the method works and when it does not. The biases in the measurements are reflected in the correlation of the position errors when the method fails. This indicates that a simple extension to multiple epochs of data will not dramatically improve the results for the 5-km baseline.

The LMS method is basically a technique to 'solve' a linear system of inequalities which have a certain structure. The word solve is used in the sense of correctly determining the integer grid points which are local minima of the cost function. Although we have focused on the application of the LMS technique with double-difference equations, LMS can be used to find the local minima for single-difference equations as well since single difference equations have similar linear structure.

An interesting aspect of the method is that finding the local minima subset can be seen as a purely geometrical problem, relying on the measurements only through the term Qv.

Another important aspect of the method is that it is independent of the difference scheme. Differencing can be chosen as desired, for example, to improve geometry, to minimize frequency deltas for GLONASS measurements or to maximize ionospheric cancellation for GPS. LMS may also be applied to more than one difference scheme at a single epoch. Looking for consistencies between the multiple schemes should make the method more robust and provide validation.

The LMS technique described herein can determine carrier phase integers in a single epoch. The technique is general and can be applied to any combination of carrier phase measurements from GPS and GLONASS. The algorithm also offers robust performance with dual-frequency GPS-GLONASS receivers.

The LMS technique is fast enough for real time use. Either dual frequency receivers or an independent first difference ionospheric advance estimation will be required to control the ionospheric errors. Local meteorological parameters may be required to bring tropospheric delays within acceptable limits.

The present invention is clearly not limited to receivers or specific hardware disclosed herein. In addition, although FIGS. 3A–3D and FIGS. 4A–4D correspond to test results from 2-km and 5-km baselines respectively, tests of the present invention at greater distances have also been performed successfully. Furthermore, although the present invention has been discussed primarily in the context of using the L1 signal from GPS and/or GLONASS satellites, the present invention may also use GPS L1–L2 signals, or GPS and GLONASS L1, or the various combinations of these signals. The present invention provides an efficient approach to identify the three-dimensional subspace and search this subspace.

Although the present invention has been shown and described with respect to several preferred embodiments thereof, various changes, omissions and additions to the form and detail thereof, may be made therein, without departing from the spirit and scope of the invention.

What is claimed is:

1. A navigation receiver system for real-time precise relative positioning in cooperation with an associated carrier phase receiver, wherein the navigation receiver and the associated carrier phase receiver both sample signals during a single epoch, and the associated carrier phase receiver processes the received signals to provide and transmit first carrier phase measurement data, said navigation receiver system comprising:

a data link receiver that receives said first carrier phase measurement data from the associated carrier phase receiver;

a carrier phase receiver that receives carrier phase signals during the sampling epoch, and processes said carrier phase signals to provide a second carrier phase measurement data; and a processing unit that receives said first carrier phase measurement data and said second carrier phase measurement data and computes carrier phase difference measurements, and applies a local-minima search technique comprising (i) a characterization of a 3-D subspace of a larger ambiguity space and (ii) a scheme for enumerating elements of this subspace which are local minima of a cost function associated with said carrier phase difference measurements to resolve carrier phase integer ambiguities from within the 3-D sub space of local minima, wherein said resolved carrier phase integers are subsequently used to determine a precise relative position of the navigation receiver system.

2. The system of claim 1, wherein said carrier phase receiver comprises a GPS receiver.

3. The system of claim 1, wherein said carrier phase receiver comprises a GLONASS receiver.

4. The system of claim 1, wherein said processing unit comprises means responsive to said first carrier phase measurement data and said second carrier phase measurement data, for computing carrier phase double difference measurements, and applying said local-minima search technique to said carrier phase double difference measurements to resolve carrier phase integer ambiguities within the subspace of local minima, wherein said resolved carrier phase integers are subsequently used to determine a precise relative position of the navigation receiver system.

5. The system of claim 1, wherein said processing unit comprises means responsive to said first carrier phase measurement data and said second carrier phase measurement data, for computing carrier phase single difference measurements, and applying said local-minima search technique to said carrier phase single difference measurements to resolve carrier phase integer ambiguities within the subspace of local minima, wherein said resolved carrier phase integers are subsequently used to determine a precise relative position of the navigation receiver system.

6. The system of claim 1, wherein said a data link receiver comprises a wireless receiver that receives said first carrier phase measurement data.

7. The system of claim 1, wherein said processing unit comprises means for delivering said subspace of local minima by applying constraints characterized by an inequality representation of a three dimensional subspace of a full ambiguity space.

8. A navigation receiver system for real-time precise relative positioning in cooperation with an associated carrier phase receiver, wherein the navigation receiver and the associated carrier phase receiver both sample signals during a single epoch, and the associated carrier phase receiver processes the received signals to provide and transmit first carrier phase measurement data, said navigation receiver system comprising:

a data link receiver that receives said first carrier phase measurement data from the associated carrier phase receiver;

a carrier phase receiver that receives carrier phase signals from a satellite during the sampling epoch, and processes said carrier phase signals to provide a second carrier phase measurement data; and a processing unit that receives said first carrier phase measurement data and said second carrier phase measurement data and computes carrier phase difference measurements, and applies a local-minima search technique to said carrier phase difference measurements to resolve carrier phase integer ambiguities within the subspace of local minima, wherein said resolved carrier phase integers are subsequently used to determine a precise relative position of the navigation receiver system.

9. A high accuracy navigation system, comprising:

a first receiver system comprising a first carrier phase receiver;

a second receiver system that provides real-time precise relative positioning in cooperation with said first carrier phase receiver, said second receiver system and said first carrier phase receiver both sample signals during a single epoch, and said first carrier phase receiver processes the received signals to provide and transmit first carrier phase measurement data, wherein said second receiver system comprises (i) a data link receiver that receives said first carrier phase measurement data;

(ii) a second carrier phase receiver that receives carrier phase signals during the sampling epoch, and processes said carrier phase signals to provide a second carrier phase measurement data; and (iii) a processing unit that receives the first carrier phase measurement data and the second carrier phase measurement data and computes carrier phase difference measurements and applies a local-minima search technique comprising (i) a characterization of a three-dimensional subspace of a larger ambiguity space and (ii) a scheme for enumerating elements of this subspace which are local minima of a cost function associated with said carrier phase difference measurements to resolve carrier phase integer ambiguities from within the three-dimension subspace of local minima, wherein said resolved carrier phase integers are subsequently used to determine a precise relative position of the high accuracy navigation system.

10. The high accuracy navigation system of claim 9, wherein said second carrier phase receiver comprises a GPS receiver and a GLONASS receiver.

11. The high accuracy navigation system of claim 10, wherein said processing unit comprises means for determining said subspace of local minima by applying constraints characterized by an inequality representation of a three dimensional subspace of a full ambiguity space.

12. The high accuracy navigation system of claim 11, wherein said processing unit comprises means responsive to said first carrier phase measurement data and said second carrier phase measurement data, for computing carrier phase double difference measurements, and applying said local-minima search technique to said carrier phase double difference measurements to resolve carrier phase integer ambiguities within the subspace of local minima, wherein said resolved carrier phase integers are subsequently used to determine a precise relative position of the navigation receiver system.

* * * * *